(12) United States Patent
Sare et al.

(10) Patent No.: US 7,148,169 B2
(45) Date of Patent: Dec. 12, 2006

(54) MULLITE-RICH CALCINED KAOLIN COMPOSITIONS AND METHODS FOR IMPROVED CASTING RATES IN CAST CERAMIC BODIES

(75) Inventors: Edward J. Sare, Macon, GA (US); John D. Sagurton, Mahwah, NJ (US); Tommy L. Adkins, Cochran, GA (US)

(73) Assignee: Imerys Pigments, Inc.

( * ) Notice: Subject to any disclaimer, the term of this patent is extended or adjusted under 35 U.S.C. 154(b) by 120 days.

(21) Appl. No.: 10/679,426

(22) Filed: Oct. 7, 2003

(65) Prior Publication Data

US 2004/0116274 A1    Jun. 17, 2004

Related U.S. Application Data

(60) Provisional application No. 60/416,231, filed on Oct. 7, 2002.

(51) Int. Cl.
*C04B 33/00* (2006.01)
(52) U.S. Cl. .................................. 501/141; 423/328.2
(58) Field of Classification Search ............. 501/128, 501/130, 141; 423/328.2
See application file for complete search history.

(56) References Cited

U.S. PATENT DOCUMENTS

| | | | |
|---|---|---|---|
| 3,663,165 A * | 5/1972 | Haden et al. ............... | 423/711 |
| 3,885,977 A | 5/1975 | Lachman et al. | |
| 4,001,028 A | 1/1977 | Frost et al. | |
| 4,385,129 A | 5/1983 | Inoguchi et al. | |
| 4,434,117 A | 2/1984 | Inoguchi et al. | |
| 4,601,997 A | 7/1986 | Speronello | |
| 4,950,628 A | 8/1990 | Landon et al. | |
| 5,143,871 A | 9/1992 | Leese et al. | |
| 5,147,830 A | 9/1992 | Banerjee et al. | |
| 5,716,894 A | 2/1998 | Messer et al. | |
| 6,004,501 A | 12/1999 | Cornelius et al. | |
| 6,214,437 B1 * | 4/2001 | Beall et al. ................ | 428/116 |

FOREIGN PATENT DOCUMENTS

EP     0 360 547 A1    3/1990

OTHER PUBLICATIONS

[No author available] "Material Safety Data Sheet, Glomax LL," prepared by Dry Branch Kaolin, Jan. 1991.*

* cited by examiner

*Primary Examiner*—David Sample
(74) *Attorney, Agent, or Firm*—Finnegan, Henderson, Farabow, Garrett & Dunner, LLP

(57) ABSTRACT

A method of method of making a formed ceramic body, comprising casting or jiggering a composition comprising a mullite-rich calcined kaolin obtained from a hydrous kaolin. Also provided is a method of modifying/increasing the casting rate of a formed body formulation comprising hydrous kaolin, the method comprising substituting at least 10% of the hydrous kaolin in the formulation with a mullite-rich calcined kaolin. Also provided is a ceramic body filter cake comprising a mullite-rich calcined kaolin, wherein the mullite-rich calcined kaolin is obtained from a hydrous kaolin and a method of modifying/increasing the filtration rate of a ceramic body filter cake comprising hydrous kaolin, the method comprising substituting at least 10% of the hydrous kaolin in the ceramic body filter cake with a mullite-rich partially calcined kaolin. Also provided are dried greenware products and final ware products comprising a mullite-rich calcined kaolin, wherein the mullite-rich calcined kaolin is obtained from a hydrous kaolin.

31 Claims, 1 Drawing Sheet

MULLITE-RICH CALCINED KAOLIN COMPOSITIONS AND METHODS FOR IMPROVED CASTING RATES IN CAST CERAMIC BODIES

RELATED APPLICATION

This nonprovisional application claims the benefit of priority under 35 U.S.C. § 119(e) to U.S. Provisional Application No. 60/416,231, filed Oct. 7, 2002, entitled "MULLITE-RICH CALCINED KAOLIN COMPOSITIONS AND METHODS FOR IMPROVED CASTING RATES IN CAST CERAMIC BODIES," the disclosure of which is incorporated by reference herein in its entirety

BACKGROUND OF THE INVENTION

1. Field of the Invention

This invention relates to the field of making formed ceramic bodies. In one aspect, the present invention relates to a method of making a cast or jiggered ceramic body comprising casting a composition comprising a mullite-rich calcined kaolin obtained from a hydrous kaolin.

2. Background Art

Jiggering is a ceramic forming process wherein a shaping tool is used to shape the surface of a slug of clay that is formed onto the surface of a rotating mold. One surface of the jiggered product is defined by the mold surface, and the other by the shape produced but the shaping tool. Jiggering is particularly suited for the production of round and oval shapes such as plates and bowls.

Another ceramic forming process is slip casting. Slip casting is typically used in production of products having complex shapes and where plastic forming or semi-dry pressing are not possible. Thus, slip casting is applicable to the production of, for example, hollow tableware, figures and ornamental ware, and sanitary ware. For whiteware production, 'jiggering' can also be used to produce ware. Slip casting involves the use of a mold of appropriate shape into which a fluid suspension of a body can be poured and which mold progressively extracts some of the water until a solid layer is formed.

Two primary methods are typically employed for slip casting: drain casting and solid casting. In drain casting, a mold is filled with slip and casting takes place on one surface only. After a suitable time, during which the desired cast thickness is built up, the excess slip is poured off. The mold and cast are then partially dried, to allow mold release, after which the cast can be trimmed, cut or sponged. In solid casting, which is typically used for products having varying wall thicknesses, the mold is filled with slip and casting takes place on both surfaces. The removal of water generally means that the slip has to be topped up during the casting. For complex shapes, the mold can be constructed in several sections.

Rheological properties of casting slips can be important to the slip casting process. In order to make the casting process commercially acceptable, in standard methods, the rate of casting is as high as possible, which typically requires high solids content slips. High solids content slips are typically achieved by reducing the viscosity of the slip using deflocculants. Suitable slips are typically made in a moisture content range of about 27 to 35%.

Additionally, the texture of the cast can be important, which texture is affected by both the thixotropy and the fluidity. The permeability of the cast influences features such as drying. The body formulation can affect the density of the cast, which influences the casting rate.

The physical dewatering process depends upon several factors, including the solids concentration in the slip, the permeability of the cast, and the pore size distribution in the mold, which determines the suction and the permeability. The rate of casting relates to the permeability and porosity of the cast slip.

Previous methods of making cast ceramic bodies utilized hydrous clays. In one aspect, the present invention provides methods of forming a ceramic body using a mullite-rich calcined kaolin which yields significantly greater casting rates than previous casting methods. In another aspect, the present invention also provides products having much superior casting rates than the previous hydrous clays, for example hydrous kaolins and hydrous ball clays.

In yet another aspect of the present invention, mullite-rich calcined kaolin-containing clays are used to achieve compositions having surprisingly good casting rates, even when the kaolin comprises significant amounts of impurities. Thus, by the present method, one can even make cast ceramic bodies from kaolin clay that is often considered unusable for achieving fast casting, such as ball clay or other fine clays.

SUMMARY OF THE INVENTION

In one aspect, the present invention provides a method of making a formed ceramic body comprising casting a composition comprising a mullite-rich calcined kaolin obtained from a hydrous kaolin. In another aspect, the present invention provides a method of making a formed ceramic body comprising jiggering a composition comprising a mullite-rich calcined kaolin obtained from a hydrous kaolin. In another aspect, the present invention also provides a method of modifying/increasing the casting rate of a formed body formulation comprising hydrous kaolin, the method comprising substituting at least 10% of the hydrous kaolin in the formulation with an a mullite-rich calcined kaolin.

In another aspect, the present invention also provides a method of making a formed ceramic body, comprising casting or jiggering a composition comprising an a mullite-rich calcined kaolin and a hydrous kaolin. In other aspects, the invention provides a ceramic body filter cake comprising an a mullite-rich calcined kaolin, wherein the mullite-rich calcined kaolin is obtained from a hydrous kaolin, dried greenware products comprising a mullite-rich calcined kaolin, wherein the mullite-rich calcined kaolin is obtained from a hydrous kaolin, and/or final ware products produced from the dried greenware products.

BRIEF DESCRIPTION OF THE DRAWING

(FIG. 1 A) shows the Baroid Filter data of the relative dewatering rates of a moderately coarse, whole crude hydrous kaolin (A-Hydrous) mixed with increasing amounts of significantly smaller particle size mullite-rich calcined clay (B-Calcined).

DETAILED DESCRIPTION OF THE INVENTION

Figure 1A:
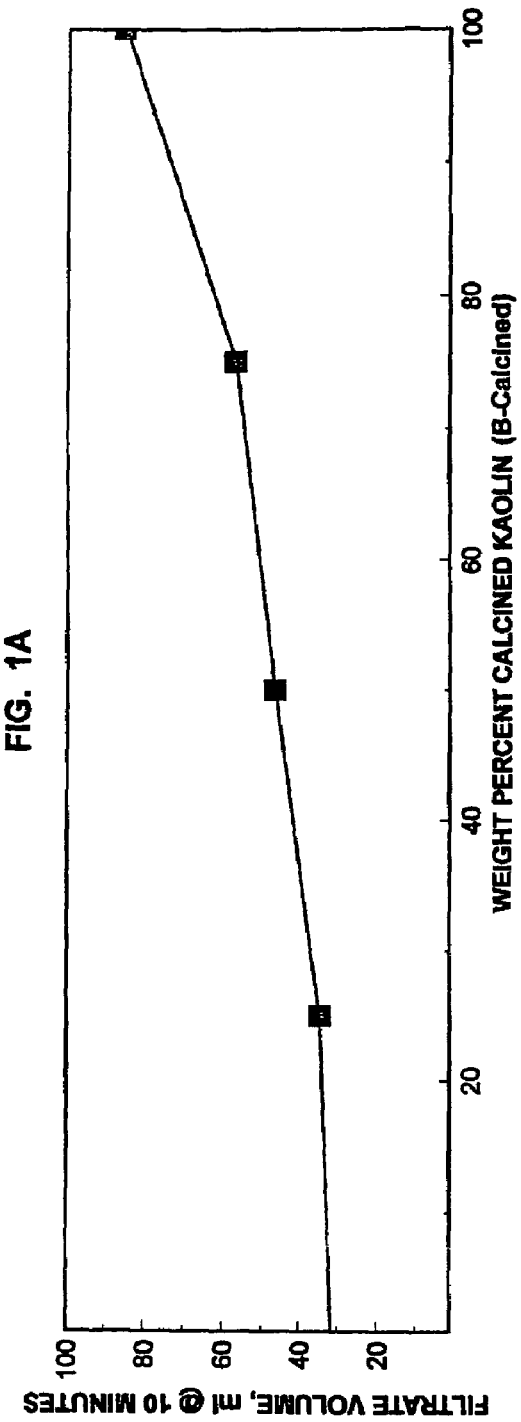
FIG. 1 shows Baroid Filter data comparison of different size hydrous kaolin-containing clays mixed with different size calcined kaolin-containing clays.
(FIG. 1B) shows the Baroid Filter data of a relatively fine, fractionated hydrous kaolin (C-Hydrous) mixed with increasing amounts of a moderately coarse mullite-rich calcined kaolin (D-Calcined).

The present invention may be understood more readily by reference to the following detailed description of the embodiments of the invention and the Examples included therein.

Before the present compounds and methods are disclosed and described, it is to be understood that this invention is not limited to specific hydrous kaolins or specific calcined kaolins, as such may, of course, vary. It is also to be understood that the terminology used herein is for the purpose of describing particular embodiments only and is not intended to be limiting.

It must be noted that, as used in the specification and the appended claims, the singular forms "a," "an," and "the" include plural referents unless the context clearly dictates otherwise.

In one aspect, the invention relates to a method of making a formed ceramic body comprising casting or jiggering a composition comprising a mullite-rich calcined kaolin obtained from a hydrous kaolin. A calcined kaolin-containing clay is typically obtained by heating a hydrous kaolin-containing clay until its combined water has been removed; see, e.g., the "Condensed Chemical Dictionary," 6th Edition (Reinhold Publishing Company, New York, 1961), the disclosure of which is hereby incorporated by reference into this specification. Calcination is a process known to one skilled in the art and the conditions for calcination are also known to one skilled in the art. Typically full calcination occurs at $\geq 900°$ C. and a relatively pure hydrous kaolin would lose approximately 14% combined water from calcination; i.e. the loss on ignition (LOI) is approximately 14%. When kaolins are calcined at high temperatures, a portion of the kaolin may be converted into needle-like crystals of aluminum silicate known as 'mullite'. The mullite-rich calcined kaolins used in the present invention include any fully calcined kaolins having a mullite content of greater than about 3% by weight, such as for example between 3% and 45% by weight, between 3% and 40%, between 3% and 30% by weight, between 3% and 20% by weight, or between 10% and 20% by weight.

The hydrous kaolin-containing clay or the hydrous kaolin for the methods and compositions claimed herein can comprise any kaolin clay, crude, processed or partially processed. For example, the kaolin clay can be a crude kaolin clay, whole or partially. The crude can comprise any kaolin crude clay; for example, it can comprise grey clay, it can comprise cream clay, and thus the crude can be a combination of clays, such as a clay predominantly cream or grey crude or a hard or soft clay. In some cases, the crude can comprise Brazilian kaolin crude or English kaolin crude. The crude can contain organic matter (i.e., grey crude) or it can be a crude substantially lacking organic matter (i.e., cream, tan, brown, or red crudes). The hydrous kaolin-containing clay may also comprise a gibbsitic kaolin or a ball clay.

Other materials can be present in the hydrous kaolin-containing clay, and therefore in the mullite-rich calcined kaolin-containing clay that is used in the claimed methods and compositions. For example, the hydrous kaolin may comprise a low kaolin content crude clay and a significant quantity of one or more of silica, crystalline silica, or any other material, compound, or composition found or used in ceramic body material. In one aspect of the invention, the crude hydrous clay may comprise about 1% silica or less, such as for example about 0.5% silica or less. In another aspect of the present invention, the crude hydrous clay may have a kaolin content of about 90% or less and at least 0.1% of one or more of silica, crystalline silica, feldspar, alumina, calcined alumina, or other ceramic body material.

The hydrous or calcined kaolin-containing clay can also comprise a fractionated kaolin or kaolins or a combination of fractions. For example, the hydrous kaolin can comprise a fine kaolin fraction or a coarse kaolin fraction, or any combination thereof. The final calcined kaolin used in the present invention may have a median particle size for example of about 5 microns or less, or even about 2 microns or less.

Additionally, the kaolin used in any of the claimed methods can be a fractionated clay, having a particle size distribution that has been modified or aggregated, such as by mechanical methods or by alternative methods such as chemical fractionation or aggregation, which methods are all known in the art. Fractionation can be performed at any desired step in the method, such as prior to or after calcining the kaolin-containing clay.

Additionally, the clay (or crude), kaolin or other clay, can be ground, e.g., delaminated to modify its particle size and/or shape. Delamination methods are well known in the art. Additionally, modification of a resultant at least partially calcined kaolin can be made, by for example, grinding. Grinding procedures are well known in the art, and can include, for example, mechanical grinding or attrition grinding.

As seen in the examples, the permeability, as measured in the examples as the rate of water release, porosity, as measured in the examples as the total amount of water released, and "time to blowout" (time it takes to remove all water), all as measured by a Baroid filter apparatus, are significantly improved over the hydrous kaolin examples (e.g., 67F and 67G).

The present invention is more particularly described in the following examples which are intended as illustrative only since numerous modifications and variations therein will be apparent to those skilled in the art.

EXAMPLES

Tables I, III, and V provide data obtained in Baroid Filter studies of mullite-rich calcined kaolin or kaolin-containing clays. In each case, the mullite-rich calcined product significantly and unexpectedly improves the casting rate relative to hydrous clay. The kaolins examined include the following: (1) a wide range of relative particle sizes, (2) a partially-calcined or metakaolin, (3) a very high mullite-containing calcined kaolin, (4) a fully calcined product made using a "whole kaolin crude" calcination feed (the other samples utilize a fractionated calcination feed), (5) a fully calcined kaolin product whose particle size distribution has been modified by attrition grinding, (6) a fully calcined product made using a low purity kaolin-containing crude (in this case other minerals and organics are present), i.e., a ball clay, and (7) a fully calcined product made using a low purity kaolin-containing crude (e.g., about 90% or less kaolinite, less than 85% kaolinite, or even less than 75% kaolinite) that also contains a significant quantity (e.g., greater than 0.1% or greater than 0.25%) of one or more of the other minerals/components used in the ceramic body formulation, e.g., crystalline or amorphous and/or crystalline silica, feldspar, alumina, calcined alumina, or other ceramic body material. In the case of the last two products, this also demonstrates that the products can be prepared from a feed produced from an air-float process, as well as the water-wash process (note a whole crude product could also be produced using the water-wash process). Additionally, a "gibbsitic" kaolin which has a higher overall $Al_2O$—$SiO$, can also be used in this method/product.

TABLE I

Baroid Filter Data Summary
(25 Silica/25 "Kaolin"/25 Flux/25 Ball
Clay Formulation @ pH = 3.5, 55% Solids Slurry

| Sample No. | Description | Water Released in ml. 5 Min. | 10 Min. | 15 Min. | 20 Min. | Time to Blowout, Minutes |
|---|---|---|---|---|---|---|
| 67F | Hydrous Kaolin Calcine Feed for 67J and 67D | 31 | 46 | 58 | 68 | 34 (92 ml.) |
| 67J | Mullite-Rich Calcined, Moderately Coarse Particle Size | 43 | 63 | 78 | —[1] | 16 (81 ml.) |
| 67A | Mullite-Rich Calcined, Coarse Particle Size | 55 | 80 | —[1] | —[1] | 11 (84 ml.) |
| 67D | Mullite-Rich Calcined, Moderately Coarse Particle Size, High Mullite | 48 | 71 | —[1] | —[1] | 12 (78 ml.) |
| 67G | Hydrous Kaolin Calcine Feed for 67C and 67E | 21 | 31 | 39 | 46 | 40 (69 ml.) |
| 67C | Mullite-Rich Calcined Fine Particle Size | 40 | 58 | —[1] | —[1] | 11 (60 ml.) |
| 67E | Partially Calcined Fine particle Size | 28 | 42 | 52 | —[1] | 18 (58 ml.) |
| 67H | Partially Calcined Fine Particle Size | 32 | 47 | 59 | —[1] | 15 (59 ml.) |
| 67B[2] | Mullite-Rich Calcined Lower Kaolin Purity | 45 | 66 | 82 | —[1] | 17 (88 ml.) |
| 67K[3] | Mullite-Rich Calcined Lower Kaolin Purity Crystalline Silica-Containing | 46 | 67 | 84 | —[1] | 17 (90 ml.) |
| 67I[2] | Mullite-Rich Calcined Ball Clay (Kaolin-Containing) | 46 | 69 | 86 | —[1] | 17 (93 ml.) |

[1]Complete Dewatering
[2]Air-float feed
[3]In this case, the calcination feed used to prepare sample 67B was first mixed with an equal weight of the crystalline silica used in the casting studies. This 50/50 (by weight) feed was then fully calcined to form a mullite-rich calcined kaolin. In the subsequent casting trial, the body formulation was correspondingly changed to a 50 parts sample 67K/25 parts Flux/25 parts ball clay slurry.

The experimental procedure for this Baroid Filter assay (300 grams Dry Basis Sample @ 55.0% Solids) is as follows: 75 g of nepheline syenite (Flux), 75 g Flint (crystalline silica), 75 g "Kaolin", 75 g (dry basis) ball clay slurry—123.2 grams slurry @ 60.9% solids, 197.3 g deionized water, and 0.09 g Colloid 211 Dispersant (0.05% dosage on clay only) is mixed 2 minutes in a 1 quart Waring blender, flocced to pH 3.5 with 10% $H_2SO_4$. 400 grams of this mixture is then used to run the Baroid filtration test @ 50 psi. The filtrate is measured as a function of time, and the time of "blowout" (complete dewatering) is measured, along with the final filtrate volume. "Kaolin"=Hydrous Kaolin or Calcined Kaolin component.

TABLE II

Summary of Properties for the Calcined Samples of Table 1

| Sample No. | LOI (%) | Mullite[1] (%) | Particle Size[2] % <2μ |
|---|---|---|---|
| 67F | 13.9 | —[3] | 68 |
| 67J | <0.5 | 3.7 | 62 |
| 67A | <0.5 | 3–15 | 24 |
| 67D | <0.5 | 42.6 | 61 |
| 67G | 14.1 | —[3] | 98 |
| 67C | <0.5 | 2.5 | 86 |
| 67E | 1.8 | <1 | 92 |
| 67H | 6.2 | <1 | 94 |
| 67B | <0.5 | 0.5 | N.D. |

TABLE II-continued

Summary of Properties for the Calcined Samples of Table 1

| Sample No. | LOI (%) | Mullite[1] (%) | Particle Size[2] % <2μ |
|---|---|---|---|
| 67K | <0.5 | 3–10 | N.D. |
| 67I | <0.5 | 3–10 | N.D. |

[1]Mullite content is estimated based on LOI where in italics.
[2]Sedigraph 5100
[3]Mullite not present.

TABLE III

Baroid Filter Data Summary
Hydrous Kaolin vs. Calcined Kaolin Comparison
40% Solids, Acid-Flocced

| Sample No. | Description | Water Released in ml. 5 Min. | 10 Min. | 15 Min. | 20 Min. |
|---|---|---|---|---|---|
| 97E | Hydrous Kaolin | 21.5 | 31.6 | 39.5 | 46.2 |
| 97F | Mullite-Rich Calcined Kaolin | 41.7 | 60.6 | 75.1 | 87.4 |

TABLE IV

Summary of Properties for the Samples in the Hydrous Kaolin vs. Caclined Kaolin Comparison of TABLE III

| Sample No. | LOI (%) | Mullite[1] (%) | Particle Size[2] % <2μ | Surface Area BET, m²/g |
|---|---|---|---|---|
| 97E | 13.9 | —[3] | 90.0 | 16.8 |
| 97F | 0.6 | 3–10 | 90.8 | 17.0 |

[1]Estimated based on LOI.
[2]Sedigraph 5100
[3]Mullite not present.

TABLE V

Baroid Filter Data Summary
(25 Silica/25 Calcined Kaolin/25 Flux/25 Delaminated Hydrous Kaolin Formulation @ pH = 3.7, 55% Solids Slurry

| Sample No. | Description of Calcined Kaolin | Water Released in ml. 2 Min. | 5 Min. | 10 Min. | Time to Blowout, Minutes | Final Solids |
|---|---|---|---|---|---|---|
| 36A | Fully Calcined Moderately Coarse Particle Size | 33.6 | 55.2 | —[1] | 7.4 | 66.3% |
| 36B | Fully Calcined Fine Particle Size | 28.6 | 46.9 | —[1] | 6.0 | 63.2% |
| 36C | Fully Calcined Attrition Ground | 25.4 | 42.2 | 61.2 | 14.6 | 67.6% |

[1]Complete Dewatering

TABLE VI

Summary of Properties for Calcined Kaolin Components of Table V

| Sample No. | LOI (%) | Estimated Mullite (%) | Particle Size[1] % <2μ |
|---|---|---|---|
| 36A | <0.5 | 3–10 | 62.2 |
| 36B | <0.5 | 3–10 | 89.3 |
| 36C | <0.5 | 3–10 | 95.4 |

[1]Sedigraph 5100

From these results, one can see that this unexpected improvement in relative casting is found for a very broad range of calcined kaolin-based products. For example, even the ~6% LOI product, 67H (see Table I and II), shows a significant advantage over the corresponding hydrous kaolin(s). Any calcined kaolin-"rich" products with an LOI (loss on ignition) of<about 1.0%, more preferably<about 0.5% can be used in these methods and in these products. The overall LOI for the "product" will be a function of the extent of dehydroxylation of the kaolin and the relative quantity of kaolin present. For example, one can obtain a 7% LOI product by partial calcination (dehydroxylation) to about 50% of a "pure" kaolin (starting LOI of about 14%), or by full calcination of a 50% silica/50% kaolin feed. Additionally, the LOI can be loosely related to the mullite content of the calcined kaolin and is sufficient to provide a rough estimate of mullite content in cases wherein the mullite content has not been classified.

With respect to particle size, the "coarser" products are typically preferred over the finer products for relative casting rate. However, even the finest calcined kaolin is significantly better than a significantly coarser hydrous kaolin (compare 67F versus 67C in the Tables I and II). This is likely due to the "preferential" aggregation of the smaller particles in the feed during calcination. This may be due, at least in part, to an increase in overall porosity in the calcined kaolin due to the aggregation, or to the reduction in fine particles that can "migrate" more rapidly to the interstices between particles. Thus, the reduction in fine particles improves the overall permeability. For example, compare samples 36A, 36B, and 36C in Tables V and VI which demonstrates a lower water release rate with decreasing particle size.

The benefits discovered and disclosed herein by calcining kaolin-containing clays to the extent wherein they become mullite-rich are observed regardless of the starting material. For example, when moderately coarse, whole crude hydrous kaolin (A-hydrous) is mixed with increasing amounts of significantly smaller particle size calcined clay (B-calcined), the water filtration rate consistently increases (FIG. IA and Table VII). Similarly, when a relatively fine, fractionated hydrous kaolin (C-hydrous) is mixed with increasing amounts of a moderately coarse calcined kaolin (D-calcined), the water filtration rate also consistently increases (FIG. 1B and Table VII).

TABLE VII

Figure 1B:
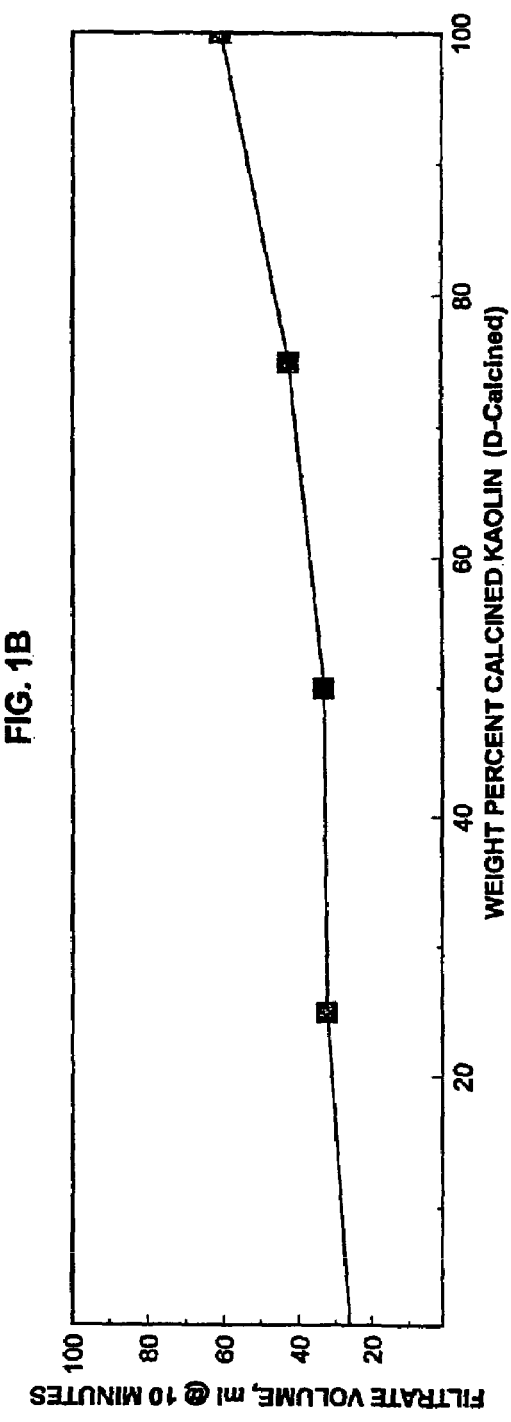

Summary of Properties for the Kaolin Containing Samples of FIG. 1

| Sample | LOI (%) | BET Surface Area m²/g | Particle Size[1] % <2μ |
|---|---|---|---|
| A-Hydrous | 14.0% | 14.7 | 67.2 |
| B-Calcined | 0.6% | 17.0 | 90.8 |
| C-Hydrous | 13.9% | 16.8 | 90.0 |
| D-Calcined | 0.3% | 9.8 | 62.7 |

Thus, in one aspect, the present invention provides methods of improving (i.e., increasing) the permeability and/or the porosity in a ceramic product by utilizing a mullite-rich calcined kaolin (i.e., LOI of about 1% or less, for example about 0.5% or less) as, for example, at least part of the kaolin component. Mullite-rich calcined kaolin can be utilized as a casting rate modifier. In another aspect, the present method provides the use of at least partially calcined kaolin as at least a partial replacement for the "normal" hydrous kaolin-containing clay component of the body formulation. For example, one can replace about 10% of the hydrous kaolin-containing clay component, about 25% of the hydrous kaolin-containing clay component, about 40% of the hydrous kaolin-containing clay component, about 50% of the hydrous kaolin-containing clay component, about 60% of the hydrous kaolin-containing clay component, about 75% of the hydrous kaolin-containing clay component, about 85% of the hydrous kaolin-containing clay component, about 95% of the hydrous kaolin-containing clay component, or even up to 100% of the hydrous kaolin-containing clay component(s) of the body formulation.

In yet another aspect, the present invention provides for the use of mullite-rich calcined kaolin as at least a partial replacement for the ball clay of the body formulation, since ball clays typically contain a significant proportion of kaolin.

In some aspects, the compositions of the present invention can be utilized with both normal casting and/or pressure casting.

In another aspect, the present invention provides wet or dried filter "cakes" of the (unfired) ceramic bodies comprising mullite-rich calcined kaolin. In the whitewares industry, "jiggering" is also used to produce "ware." In this case, one can take advantage of the improved rate of "dewatering", i.e., the body is flocced and filtered (typically in a filter process). In some parts of the world, a central facility can be used to prepare these cakes for use by several facilities. Filter cakes can be produced by standard means, such as from a rotary filter or a pressurized, mechanical filter.

Additional aspects of the present invention include ceramic ware products produced using mullite-rich calcined kaolin, including both dried 'greenware' products and final ware products. In either the whiteware or sanitaryware industries, a central facility is typically used to produce, by casting (or jiggering), the (unfired) dried greenware for subsequent firing and final processing into the final ware by several facilities. The final ware products are generally formed therefrom by firing and (typically) glazing using conventional methods.

For any of these products, mullite-rich calcined kaolins as described above and in the claims can be utilized.

In another aspect, the present invention provides mullite-rich calcined products produced from relatively low purity feeds. Previous work regarding calcined kaolin has been focused on the use of relatively tightly controlled and high purity feeds to produce calcined kaolins. Samples 67B, 67I, and 67K illustrate that products of utility can be readily produced from literally "waste kaolin crude". Thus, 67B was produced from a kaolin crude that is an extremely viscous kaolin crude, which previously would essentially never be introduced into a "water-washed" process. Similarly 67I was produced from a ball clay, which while it contains an appreciable level of kaolin, is not even considered in the industry to be a kaolin commercially. Also it appears that there is no previous literature regarding calcined ball clays.

Finally, Sample 67K, demonstrates that a mullite-rich calcined high silica/high kaolin product has utility according to an aspect of the present invention. In the case of at least the vast majority of secondary kaolin deposits, e.g., those in Georgia and Brazil, one encounters zones of relatively low hydrous kaolin "purity", i.e.,<about 85–92% hydrous kaolin. The main impurity by far is silica (sand), which may account for as much as about 10%, 15% or even 25% by weight of the slurry. By use of an air-float type process (basically drying and pulverization) and calcination, this type of kaolin-containing waste can be used to produce a valuable mullite-rich product. For example, waste streams from water-washed and air-float kaolin clay operations or kaolin clay-containing waste streams from other mineral processing operations can also be used.

What is claimed is:

1. A method of making a ceramic body, comprising casting a composition comprising a calcined kaolin having a mullite content of at least about 3%.

2. The method of claim 1, wherein the mullite content of the calcined kaolin is in the range of from about 3% to about 40%.

3. The method of claim 1, wherein the calcined kaolin has an LOI of less than about 1%.

4. The method of claim 1, wherein the calcined kaolin has an LOI of less than about 0.5%.

5. The method of claim 1, wherein the calcined kaolin has a median particle size of about 2 microns or less.

6. The method of claim 1, wherein the calcined kaolin has a median particle size of about 5 microns or less.

7. The method of claim 1, wherein said calcined kaolin is derived at least in part from a ball clay.

8. The method of claim 1, wherein said calcined kaolin is derived at least in part from a crude clay having a kaolin content of about 90% or less.

9. The method of claim 1, wherein said calcined kaolin is derived at least in part from a crude clay having a kaolin content of about 90% or less and at least 0.1% of one or more of silica, crystalline silica, feldspar, alumina, calcined alumina, or other ceramic body material.

10. The method of claim 1, wherein said calcined kaolin is derived at least in part from a crude clay having at least 0.1% of one or more of silica, crystalline silica, feldspar, alumina, calcined alumina, or other ceramic body material.

11. The method of claim 1, wherein said calcined kaolin is derived at least in part from a crude clay having a silica content of about 1% or less.

12. The method of claim 1, wherein said calcined kaolin is derived at least in part from a crude clay having a silica content of about 0.5% or less.

13. The method of claim 1, wherein said calcined kaolin is derived at least in part from a gibbsitic kaolin.

14. The method of claim 1, wherein the calcined kaolin has been prepared from a calcination feed produced using an air-float process.

15. The method of claim 1, wherein the calcined kaolin has been prepared from a calcination feed produced from a water-wash process.

16. The method of claim 1, wherein the particle size of the calcined kaolin has been modified.

17. The method of claim 16, wherein the particle size of the calcined kaolin has been modified by attrition grinding.

18. The method of claim 1, wherein the body is formed by pressure casting.

19. The method of claim 1, wherein the body is formed by normal casting.

20. A method of modifying/increasing the casting rate of a cast body formulation comprising hydrous kaolin, the method comprising substituting at least 10% of the hydrous kaolin in the formulation with a calcined kaolin having a mullite content of at least about 3%.

21. The method of claim 20, wherein the method comprises substituting at least 25% of the hydrous kaolin in the formulation with a calcined kaolin having a mullite content of at least about 3%.

22. The method of claim 20, wherein the method comprises substituting at least 50% of the hydrous kaolin in the formulation with a calcined kaolin having a mullite content of at least about 3%.

23. The method of claim 20, wherein the method comprises substituting at least 75% of the hydrous kaolin in the formulation with a calcined kaolin having a mullite content of at least about 3%.

24. A method of making a cast ceramic body, comprising casting a composition comprising a calcined kaolin having a mullite content of at least about 3% and a hydrous kaolin.

25. The method of claim 24, wherein the calcined kaolin having a mullite content of at least about 3% comprises at least 10% of the kaolin component of the composition.

26. A method of modifying/increasing the filtration rate of a cast ceramic body filter cake comprising hydrous kaolin, the method comprising substituting at least 10% of the hydrous kaolin in the cast ceramic body filter cake with a calcined kaolin having a mullite content of at least about 3%.

27. The method of claim 26, wherein the method comprises substituting at least 25% of the hydrous kaolin in the cast ceramic body filter cake with a calcined kaolin having a mullite content of at least about 3%.

28. The method of claim 26, wherein the method comprises substituting at least 50% of the hydrous kaolin in the cast ceramic body filter cake with an a calcined kaolin having a mullite content of at least about 3%.

29. The method of claim 26, wherein the method comprises substituting at least 75% of the hydrous kaolin in the cast ceramic body filter cake with a calcined kaolin having a mullite content of at least about 3%.

30. A method of making a cast ceramic body filter cake, comprising filtering a composition comprising a calcined kaolin having a mullite content of at least about 3%.

31. The method of claim 30, wherein the calcined kaolin having a mullite content of at least about 3% comprises at least 10% of the kaolin component of the composition.

* * * * *